Patented Dec. 14, 1943

2,336,916

UNITED STATES PATENT OFFICE 2,336,916

PRODUCTION OF THIOPHENE

Michael Henry Miller Arnold, Norton-on-Tees, England, assignor to Imperial Chemical Industries Limited, a corporation of Great Britain No Drawing. Application September 21, 1940, Serial No. 357,817. In Great Britain October 12, 1939

2 Claims. (Cl. 260—329)

This invention relates to the production of thiophene from acetylene and hydrogen sulphide.

I have found that good yields of thiophene can be obtained by reacting at elevated temperature, acetylene and hydrogen sulphide or mixtures containing the same, in the presence of a catalyst comprising a water-insoluble and water-stable metallic sulphide or mixtures of such sulphides.

Examples of such sulphides are those of lead, manganese, copper, tin, molybdenum, cobalt and nickel. Particularly good yields of thiophene are obtained when the catalyst comprises lead sulphide and/or manganese sulphide. The sulphides may be in massive form, e. g., as pellets, but it is advantageous to deposit the metallic sulphide or sulphides on a porous support, for example, activated alumina or pumice.

The theoretical volumetric ratio of acetylene to hydrogen sulphide is 2:1, according to the equation $2C_2H_2 + H_2S \rightarrow C_4H_4S + H_2$, but higher or lower ratios may be employed. I have found, however, that there is greater ease of temperature control, less risk of carbon formation on the catalyst, and a slower accumulation of tarry matter, when the ratio of acetylene to hydrogen sulphide is less than 2:1, and more particularly between 4:3 and 2:3.

It is desirable that water should be substantially absent from the reactants, since it detrimentally affects the activity of the catalyst.

In general, the catalysts should be maintained at a temperature between 500° C. and 750° C. Below 500° C. there is little tendency for the reaction to take place, while above 750° C. decomposition of the acetylene, with attendant deposition of carbon, tends to occur. It is preferable to work at temperatures between 650° C. and 700° C. in order to obtain the optimum rate of reaction.

The process may be carried out in stages. Thus, after partial reaction between acetylene and hydrogen sulphide in one stage, the thiophene and other normally liquid products, may be removed by condensation, and a further quantity of acetylene or acetylene-containing gas added to the residual gases before allowing the reaction to proceed in a further stage. By this means, the initial hydrogen sulphide can be more thoroughly utilised, and the preferred ratios of acetylene and hydrogen sulphide can be adhered to more closely throughout the whole course of the reaction.

The following examples illustrate how the process of this invention may be carried out in practice.

Example 1

A mixture of acetylene and hydrogen sulphide in equal volumes was passed over a catalyst composed of manganese sulphide supported on porous alumina, and maintained at a temperature of 680° C. The rate of flow of the gas mixture over the catalyst was 50 volumes per volume of catalyst space per hour. The gases leaving the reaction zone were cooled down to normal temperature, and a liquid condensed out which contained approximately 60% by weight of thiophene and 5% by weight of carbon disulphide, the remainder being alkyl thiophenes and condensed thiophenes. The amount of liquid product obtained was equivalent to 50% of the acetylene treated.

Example 2

The process was carried out as described in Example 1, and to the residual gases (which contained 27% by volume of acetylene, 52% by volume of hydrogen sulphide, 15% by volume of hydrogen, and 6% of hydrocarbons other than acetylene), there was added enough acetylene to make the volumes of acetylene and hydrogen sulphide in the mixture equal. The gas mixture was then passed at the same space velocity as in Example 1, over a catalyst of the same composition as in Example 1, which was maintained at a temperature of 700° C. On cooling the gases leaving the reaction space to normal temperature, a liquid condensed out in an amount equivalent to 35% of the acetylene treated in the second stage. The composition of this liquid was substantially the same as that obtained in Example 1.

As many apparently widely different embodiments of this invention may be made without departing from the spirit and scope thereof, it is to be understood that the invention is not limited to the specific embodiments thereof except as defined in the appended claims.

I claim:

1. A process for the preparation of thiophene comprising contacting a gaseous mixture containing acetylene and hydrogen sulphide in a volumetric ratio of between 4:3 and 2:3 with a catalyst containing at least one sulphide of the metals, lead, manganese, copper, tin, molybdenum, cobalt, nickel supported on a porous support, said catalyst being maintained at a temperature between 500° C. and 750° C., said reaction being carried out under substantially anhydrous conditions.

2. A process for the preparation of thiophene comprising contacting a gaseous mixture containing acetylene and hydrogen sulphide in a volumetric ratio between 4:3 and 2:3 with a catalyst containing at least one sulphide of the metals, lead, manganese, copper, tin, molybdenum, cobalt, nickel, said catalyst being maintained at a temperature between 650° C. and 750° C., said reaction being carried out under substantially anhydrous conditions.

MICHAEL H. M. ARNOLD.

CERTIFICATE OF CORRECTION.

Patent No. 2,336,916. December 14, 1943.

MICHAEL HENRY MILLER ARNOLD.

It is hereby certified that error appears in the printed specification of the above numbered patent requiring correction as follows: Page 1, second column, line 48, claim 1, for "500° C." read --650° C.--; and that the said Letters Patent should be read with this correction therein that the same may conform to the record of the case in the Patent Office.

Signed and sealed this 14th day of March, A. D. 1944.

Leslie Frazer (Seal) Acting Commissioner of Patents.